(12) United States Patent
Myers et al.

(10) Patent No.: US 11,849,070 B2
(45) Date of Patent: *Dec. 19, 2023

(54) VIRTUAL CALLER SYSTEM

(71) Applicant: Express Scripts Strategic Development, Inc., St. Louis, MO (US)

(72) Inventors: Christopher M. Myers, Dublin, OH (US); Danielle L. Smith, Cedar Park, TX (US)

(73) Assignee: Express Scripts Strategic Development, Inc., St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/895,652

(22) Filed: Aug. 25, 2022

(65) Prior Publication Data

US 2022/0407963 A1 Dec. 22, 2022

Related U.S. Application Data

(63) Continuation of application No. 16/798,082, filed on Feb. 21, 2020, now Pat. No. 11,445,068.

(51) Int. Cl.
*H04M 3/523* (2006.01)
*G06N 3/049* (2023.01)
*G10L 15/26* (2006.01)
*H04M 3/493* (2006.01)
*H04M 3/51* (2006.01)
*H04M 11/10* (2006.01)

(52) U.S. Cl.
CPC ......... *H04M 3/5233* (2013.01); *G06N 3/049* (2013.01); *G10L 15/26* (2013.01); *H04M 3/4933* (2013.01); *H04M 3/4936* (2013.01); *H04M 3/5175* (2013.01); *H04M 3/5191* (2013.01); *H04M 3/5237* (2013.01); *H04M 11/10* (2013.01)

(58) Field of Classification Search
None
See application file for complete search history.

(56) References Cited

U.S. PATENT DOCUMENTS

| 7,292,689 | B2 | 11/2007 | Odinak |
| 8,068,595 | B2 | 11/2011 | Odinak |
| 8,116,445 | B2 | 2/2012 | Odinak |
| 8,462,935 | B2 | 6/2013 | Odinak |

(Continued)

*Primary Examiner* — Antim G Shah
(74) *Attorney, Agent, or Firm* — Schwegman Lundberg & Woessner

(57) ABSTRACT

Method starts with a processor receiving configuration settings including an identified task, a relationship data, and a criticality value. Processor initializes a communication session with an agent client device. The communication session is between a virtual caller associated with the system and the agent client device. Processor then processes an audio signal of the communication session to generate an agent utterance and generates a transcribed agent utterance based on the agent utterance using a speech-to-text processor. Processor generates a virtual caller utterance using a task-specific virtual caller neural network associated with the identified task. The virtual caller utterance can be generated based on the transcribed agent utterance. Processor then causes the virtual caller utterance to be played back in the communication session to the agent client device. Other embodiments are disclosed herein.

19 Claims, 9 Drawing Sheets

(56) References Cited

U.S. PATENT DOCUMENTS

| | | |
|---|---|---|
| 8,666,032 B2 | 3/2014 | Odinak |
| 9,014,362 B2 | 4/2015 | Odinak |
| 9,565,310 B2 | 2/2017 | Odinak |
| 9,667,789 B2 | 5/2017 | Odinak |
| 9,942,401 B2 | 4/2018 | Odinak |
| 10,404,859 B1 | 9/2019 | Hernandez |
| 10,447,852 B2 | 10/2019 | Baker |
| 11,445,068 B1* | 9/2022 | Myers .................... H04M 11/10 |
| 2007/0036334 A1* | 2/2007 | Culbertson ......... H04M 3/4938 379/266.01 |
| 2009/0124272 A1 | 5/2009 | White |
| 2014/0236626 A1* | 8/2014 | Reddy Bynagari .... G16H 40/63 705/3 |
| 2016/0035353 A1* | 2/2016 | Chen ....................... G10L 13/08 704/235 |
| 2018/0063328 A1 | 3/2018 | Eisner |
| 2019/0306315 A1* | 10/2019 | Portman ............. H04M 3/5183 |
| 2020/0265835 A1 | 8/2020 | Ni |
| 2020/0395016 A1 | 12/2020 | Kapila |
| 2021/0043099 A1 | 2/2021 | Du |
| 2021/0110115 A1* | 4/2021 | Hermann ................ G06F 40/30 |
| 2021/0133582 A1 | 5/2021 | Refaat |

\* cited by examiner

VIRTUAL CALLER SYSTEM

CROSS-REFERENCE TO RELATED APPLICATIONS

This application is a continuation of U.S. patent application Ser. No. 16/798,082 filed Feb. 21, 2020, the entire disclosure of which is incorporated herein by reference. This application is also related to U.S. patent application Ser. No. 16/440,357, filed Jun. 13, 2019, and entitled "RELATIONSHIP DETERMINATION SYSTEM," to U.S. patent application Ser. No. 16/444,535, filed Jun. 18, 2019, and entitled "AGENT ACTION RANKING SYSTEM", and to U.S. patent application Ser. No. 16/721,205, filed Dec. 19, 2019, and entitled "AGENT COACHING SYSTEM", the entire disclosures of which are incorporated herein by reference.

BACKGROUND

Since a user's perception of an organization can be greatly influenced by the customer service that is provided to the user, the organization has interest in ensuring that the user's experience with the customer service is impeccable. While, traditionally, customer service is a face-to-face interaction between the user and an agent that is employed by the organization, in order to increase the ability for the user to access to an agent of the organization, customer service is now accessible via many different means of communication. For example, a user may communicate with a human agent or an automated agent via an audio call (e.g., voice over IP (VoIP), telephone) or via an electronic messaging (e.g., online chat, text messaging).

Whether the user is interacting with a human agent or an automated agent, customer service aims to help the user complete his transaction in the most timely and efficient manner while ensuring that the user's experience with the customer service is enjoyable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
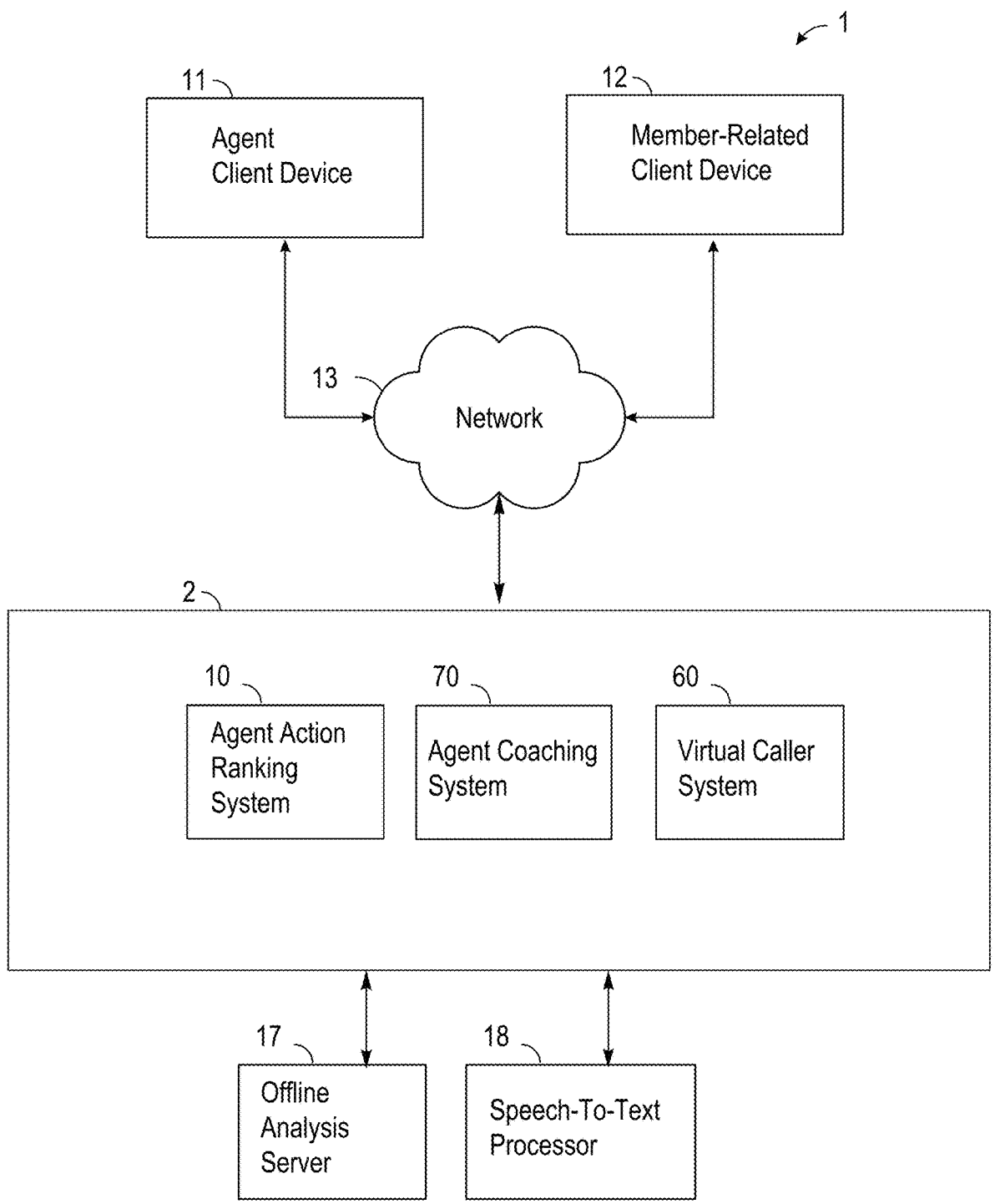
FIG. 1 is a block diagram showing an example system including a virtual caller system according to various exemplary embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of customer service methods and systems. An organization can provide its members with access to customer service via different communication channels including audio calls (e.g., telephone call, VoIP, audio message, etc.) or via electronic messages (e.g., online chat, instant messaging, email, etc.). Optimally, the customer service experience via each of the communication channels should be equally timely, efficient and enjoyable for the member.

A user, e.g., a member or a representative of the member, may also access the customer service of the organization. The user may contact customer service to accomplish a variety of tasks that can greatly vary in complexity. For example, simple tasks include registering for a username and password on the organization's website, or resetting a password associated with the member's online account while more complex tasks include checking an order status, placing an order, requesting information regarding a prescription, or requesting an explanation of benefits associated with an account.

To add further complexity to the servicing the member, the member can also be contacting customer service on behalf of someone else. For example, when the service provided by the organization is medical in nature, customer service call centers can receive calls or electronic messages from a user regarding prescriptions for another patient such as the user's child, spouse, parent, or charge. The user may be the member. The patient (e.g., the user's child, spouse, parent, or charge) may be the member. The user can also be a professional caregiver contacting the customer service on behalf of the patient, who is the member.

A medical group may use the customer service methods and systems as described herein. A medical group may include members, people who benefit from the medical group or are provided with medical treatment by the group. The medical group can be a medical insurer. The medical group can be a pharmacy benefit manager (PBM). The PBM may store data regarding member usage of prescription drugs. This data may be leveraged in order to provide a member the benefit and may be paid for by a client of the PBM. The clients of the PBM can include employers, group purchasing organizations, and governmental groups. In general, prescription drug and medicine data may be accessed from a PBM database. One or more operations may be performed on the prescription drug and medicine data to success data between a member and a user contacting the medical group system as described herein. The user contacting the medical group system can include a person related to the patient, a guardian of the patient, a caregiver of the patient, a medical care provider of the patient. In some cases, the user is also a member and is contacting the medical group on behalf of another member.

The tasks that the user wishes to complete are also associated with a different level of criticality that affects the interaction between the member and the agent. For example, a user (e.g., the member) may be calling about his medication that he has not yet received, or a user may be calling on behalf of a member who has not yet received their prescription medication. The criticality of the call would depend on the type of medication he is waiting on. The type of medication he is waiting on would be stored in the database of the PBM.

Accordingly, to further improve the functionality of customer service software and systems, embodiments of the present disclosure generate virtual caller utterances, including queries and responses, which are used to assess the effectiveness of the agents of the customer service system. The agents can be human or automated agents. The virtual caller system is trained to generate virtual caller utterances that effectively replicates the speech of a caller trying to complete different tasks using the customer service system. The virtual caller system is trained to provide a virtual caller utterance that addresses the previous statements made by the agent. The virtual caller utterance is further based on the configuration settings of the virtual caller. The configuration settings can include, for example, the task that the virtual caller is set to complete (e.g., status query on a prescription refill), the criticality of the virtual caller's condition, the relationship between the virtual caller and the patient to which the task is pertaining, etc.

FIG. 1 is a block diagram showing an example system 1 according to various exemplary embodiments. The system 1 can be a customer service system that includes a customer service server system 2, an agent client device 11, and a member-related client device 12 that are communicatively coupled over a network 13 (e.g., Internet, telephony network).

The agent client device 11 and the member-related client device 12 can be communicatively coupled via an audio call (e.g., VoIP, Public Switched Telephone Network, cellular communication network, etc.) or via electronic messages (e.g., online chat, instant messaging, text messaging, email, and the like). In another embodiment, the agent client device 11 and the member-related client device 12 are communicatively coupled via a telephone call using a telephony network 13. While FIG. 1 illustrates a single agent client device 11 and a single member-related client device 12, it is understood that a plurality of agent client devices 11 and a plurality of member-related client devices 12 can be included in the system 1 in other embodiments. As used herein, the term "client device" may refer to any machine that interfaces to a communications network (such as network 13) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The member-related client device 12 can include a microphone and speaker on a mobile electronic device, a telephone, or a self-service kiosk, e.g., at a pharmacy, a clinic, a doctor's office, a mobile relief center, and the like.

The network 13 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user using the member-related client device 12 can establish a communication session with an agent associated with the agent client device 11. The agent can be a human agent or an automated agent, e.g., on behalf of an organization. The automated agent can be associated with a medical group that includes the member. The automated agent can be an interactive voice response (IVR), a virtual online assistant, or a chatbot. During a communication session between the user and the agent, the customer service server system 2 identifies the member using initial context data (e.g., the phone number the member is calling from, the website login information inputted, automatic number identification (ANI), etc.) and retrieves the data on the member (e.g., member account information, name, address, insurance information, information on spouse and dependents, etc.).

The customer service server system 2 in FIG. 1 includes an agent action ranking system 10, a virtual caller system 60, and an agent coaching system 70. The customer service server system 2 can further include elements described with respect to FIGS. 8 and 9, such as a processor and memory, having instructions stored thereon, that when executed by the processor, causes the processor to control the functions of the customer service server system 2.

As shown in FIG. 1, the system 1 can also include an offline analysis server 17 and a speech-to-text processor 18 that are communicatively coupled to each other and to the customer service server system 2. In one embodiment, the offline analysis server 17 and the speech-to-text processor 18 is included in the customer service server system 2 and communicatively coupled to the agent action ranking system 10, the virtual caller system 60, and the agent coaching system 70. While not illustrated, the customer service server system 2 of FIG. 1 can also include a relationship determination system, a task determination system, and a criticality system.

Relationship Determination System:

The relationship determination system can analyze utterances or electronic messages from the communication session to build and transmit relationship data to the agent client device 11. The relationship data identifies the relationship between the user (who can be the member or the person on behalf of which the member is contacting customer service) and the member. The relationship determination system 10 can include an Application Program Interface (API) server, a relationship determination application server that can create events based on the relationship data generated, and a database that stores data processed by the relationship determination application server to build and transmit the relationship data. In one embodiment, the event includes the pertinent information about the type of relationship that is detected based on the relationship data. For example, the pertinent information can be "parent of member (identification number) 123 and member 123 is a minor". In one embodiment, a plurality of events can be generated because a user can be calling about several different members during a given call. A separate event can be generated as the context changes. For example, a user can be a user who is calling to fill a prescription for his wife and then his daughter. In this example, two separate events can be generated: a first event for husband and wife and a second event for father and daughter.

The relationship determination system receives data (e.g., strings that are on the transcribed or digitized utterances or electronic messages) and transmits data (e.g., relationship data) to, for example, the agent client device 11 and the virtual caller system 60. Strings that are on the transcribed or digitized utterances or electronic messages can be an array data structure of words comprising phrases of input from a user. For example, a string can be an array of characters that contains the data from the automated transcription. The string can include one or more words that was provided by the user in response to a query. The string can also include a series of singularly spoken letters or number. For example, the user may be providing a member identification number or a prescription number. The string can also include a combination of words and singularly spoken letters or numbers. To generate the strings, the speech-to-text processor 18 can implement Fast Fourier Transforms (FFTs) or Neural Networks such as Long-Short Term Memory Neural Networks (LSTM). The relationship determination system can receive and transmit data in real-time. In one embodiment, the relationship determination system receives data (e.g., strings that are on the transcribed/digitized utterances or electronic messages) from the virtual caller system 60 that is performing offline analysis of call recordings, audio strings, or chat transcripts between the member-related client device 12 and the agent client device 11. In one embodiment, the offline analysis server 17 is included in the customer service server system 2 and is performing the offline analysis. In another embodiment, the offline analysis server 17 is separate from customer service server system 2 and is performing the offline analysis. In one embodiment, the string that is an electronic message can be a portion of an online chat exchanged between the agent and the member that is received by the processor in real time. In this embodiment, the processor generates strings by processing online chat to parse and separate the different portions of the online chat.

Digitized utterances can be digitized audio files of user audio during the communication session. In this embodiment, the relationship determination system can transmit data (e.g., relationship data) to the virtual caller system 60 offline. When the communication session between the agent client device 11 and the member-related client device 12 is an audio communication, the audio communication is processed in the customer service server system 2 (e.g., the speech-to-text processor 18) to convert each utterance from speech to text to generate a string that is received by the relationship determination system. In this embodiment, the audio communication is processed in the customer service server system 2 to generate each user utterance to a user audio string.

The database of the relationship determination system can include membership data that includes general membership data related to the organization, rules implemented by the organization for membership, member authentication requirements, etc. The membership data can be for example data required for authentication, specific call routing requirements, information on member benefits, information on the member's plan, etc.

The database of the relationship determination system can also include personal data related to all the members associated with the organization providing the customer service. The personal data can also be related to all other patients associated with the organization via the members. The database of the relationship determination system 10 can also include a personal graph or table that stores information regarding relationships and associations between members and other patients.

The database of the relationship determination system can also store caregiver data including rules applied by the organization to authenticate caregivers, identification data for each of the caregivers in the system and the patients each caregiver is associated with, etc. Caregiver data can be, for example, types of permissible data used to authenticate a person as a caregiver such as pin numbers, member numbers, etc. Caregiver data can also set the types of data to be obtained from the user to validate the caregiver relationship.

The database of the relationship determination system can store communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, transcribed text of full utterances provided by the user.

The database of the relationship determination system can also store initial context data related to the member (e.g., user or patient) that has established a communication session with the agent client device 11. Initial context data can include, for example, website login information, automatic number identifier, telephone number or the like. Initial context data can also include member account information such as name, address, employer, medication, insurance information, preferred pharmacy, and information on member's spouse or dependents.

Task Determination System:

In the customer service server system 2 of FIG. 1, the task determination system processes information during the communication session between a user and an agent to generate an identified task. The identified task is the task that the user is wanting to complete during the communication session. The task can be related to the member that is the user, the user's spouse, child, charge, etc. Examples of tasks include, for example, checking on an order status, refilling a prescription, asking questions about a claim, paying a bill, etc. The task determination system may include an API server, task determination application server that generates the identified task, and a database to store communication session information. The communication session information includes, for example, initial context information related to the member (e.g., user or patient) such as website login information, automatic number identifier, telephone number, as well as member account information such as name, address, employer, medication, insurance information, preferred pharmacy, and information on member's spouse or dependents.

The task determination system receives data (e.g., strings included in the transcribed utterances, recorded utterances, or electronic messages) and transmits data (e.g., identified task) to, for example, the agent client device 11 and the virtual caller system 60. The task determination system 30 can receive and transmit data in real-time. In one embodiment, the task determination system 30 receives data (e.g., strings that are on the transcribed utterances or electronic messages) from the virtual caller system 60 that is performing offline analysis of call recordings or chat transcripts between the member-related client device 12 and the agent client device 11. In this embodiment, the task determination system 30 can transmit data (e.g., relationship data) to the virtual caller system 60 offline. In an example embodiment, offline can be when the user (e.g., using the member-related client device 12) is not engaged with the customer service server system 2. Offline can include a different communication path or session than the communication between the client devices 11, 12 or to the customer service server system 2. When the communication session between the agent client device 11 and the member-related client device 12 is an audio communication, the audio communication is processed in the customer service server system 2 (e.g., speech-to-text processor 18) to convert each utterance from speech to text to generate a string that is received by the task determination system 30.

Criticality System:

In the customer service server system 2 of FIG. 1, the criticality system processes information during the communication session between a user using a member-related client device 12 and an agent using agent client device 11 to generate a criticality value that indicates a level of criticality associated with the communication session. The criticality value may indicate a low or a high level of criticality. The criticality value can be a binary value (e.g., low or high) or can be a range of values. The criticality value can also be a value (e.g., from 0 to 1) that indicates the criticality of a condition that is the subject of the communication session. For example, the criticality value can indicate the level of illness of a patient. A patient undergoing chemotherapy or gene therapy may be associated with a criticality value approaching high (or approaching 1). A patient who is a transplant patient receiving maintenance medication may be associated with a criticality value of 0.5 (e.g., medium level of criticality) while a patient who is on statins which are drugs that lower cholesterol levels may be associated with a criticality value that is low (or approaching 0). The criticality system can include an API server, criticality application server that generates the criticality value, and a database to store communication session information. The communication session information includes, for example, initial context information related to the member such as website login information, automatic number identifier, telephone number, as well as member account information such as name, address, employer, medication, insurance information, preferred pharmacy, and information on member's spouse or dependents. The criticality system can generate a criticality value based on the communication session information.

The criticality system receives data (e.g., strings included in the transcribed utterances, the audio utterances or the electronic messages) and transmits data (e.g., criticality value) to, for example, the agent client device 11 and the virtual caller system 60. The criticality system 40 can receive and transmit data in real-time. Real-time can be during a communication session between the client devices 11, 12. In one embodiment, the criticality system 40 receives data (e.g., strings included in the audio utterances, the transcribed utterances or the electronic messages) from the virtual caller system 60 that is performing offline analysis of call recordings or chat transcripts between the member-related client device 12 and the agent client device 11. In this embodiment, the criticality system 40 can transmit data (e.g., criticality value) to the virtual caller system 60 offline. When the communication session between the agent client device 11 and the member-related client device 12 is an audio communication, the audio communication is processed in the customer service server system 2 (e.g., speech-to-text processor 18) to convert each utterance from speech-to-text to generate a text string that is received by the criticality system or to covert each utterance to an audio string that is received by the criticality system.

Agent Action Ranking System:

In the customer service server system 2 of FIG. 1, the agent action ranking system 10 generates an agent action ranking score that is based on the difference between the task completion probability result of a caller utterance and the task completion probability result of the preceding caller utterance. The agent action ranking system 10 also generates an agent action result including the agent action ranking score. The task completion probability result can be generated by a task completion probability system (not shown) using neural networks.

The agent action ranking system 10 receives data (e.g., strings included in the transcribed utterances, recorded utterances, or electronic messages) and transmits data (e.g., agent action result including the agent action ranking score) to, for example, the agent client device 11 and to the virtual caller system 60. The agent action ranking system 10 can receive and transmit data in real-time. In one embodiment, the agent action ranking system 10 receives data (e.g., strings that are on the transcribed utterances or electronic messages) from the virtual caller system 60 to perform real-time analysis of a communication session (e.g., audio call or electronic communication) between the member-related client device 12 and the agent client device 11. In another embodiment, the agent action ranking system 10 receives data (e.g., strings that are on the transcribed utterances or electronic messages) from the virtual caller system 60 that is performing offline analysis of call recordings or chat transcripts between the member-related client device 12 and the agent client device 11. In this embodiment, the agent action ranking system 50 can transmit data (e.g., agent action result) to the agent client device 11 and to the virtual caller system 60 offline. In an example embodiment, offline can be when the user (e.g., using the member-related client device 12) is not engaged with the customer service server system 2. Offline can include a different communication path or session than the communication between the client devices 11, 12 or to the customer service server system 2. When the communication session between the agent client device 11 and the member-related client device 12 is an audio communication, the audio communication is processed in the customer service server system 2 (e.g., speech-to-text processor 18) to convert each utterance from speech to text to generate a string that is received by the agent action ranking system 10.

The agent action ranking system 10 can includes an API server that is coupled to and provides a programmatic interface to an agent action ranking application server. For example, the agent action ranking application server, using the API server, receive real-time access to the communication session between the user and the agent (e.g., between devices 11, 12). The communication session can include, for example, an interactive voice response (IVR) or a voice call with an agent that can be a human agent or an automated agent. The agent action ranking application server may also use a batch interface to receive call recordings and analytics of the communication session from an external system for offline processing by the task determination application server 30.

The agent action ranking application server can further include speech-to-text processor that converts or transcribes an audio signal (e.g., the interactive voice response (IVR), the voice call, or the call recordings) into caller utterances that include audio caller utterances and transcribed caller utterances.

The agent action ranking application server is communicatively coupled to the database, in which is stored data that is processed by the agent action ranking application server to build and transmit the agent action result that includes the agent action ranking score. The database of the agent action ranking system 10 can store the communication session data. The communication session data is data related to a communication session (e.g., a call, a chat, etc.) between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, audio caller utterances and transcribed text of full utterances provided by the user.

The database of the agent action ranking system 10 can also store initial context data related to the member (e.g., user or patient) that has established a communication session with the agent client device 11. Initial context data can include, for example, website login information, automatic number identifier, telephone number or the like. Initial context data can also include member account information such as name, address, employer, medication, insurance information, preferred pharmacy, and information on member's spouse or dependents. The database of the agent action ranking application server can store data generated by the task determination system 30 such as, for example, identified tasks in association with caller utterances as well as positions in logical flows in association with caller utterances.

Agent Coaching System:

In the customer service server system 2 of FIG. 1, the agent coaching system 70 generates a feedback result that is based on an analysis of the communication between the user and the agent. The feedback result can include icons or messages that indicate the quality of the agent's interaction with the user (e.g., member) or can include a suggestion of an ideal response that the agent can provide to the user. The system can cause the feedback result to be displayed on the agent's client device in real-time during the communication session in order for the agent to be afforded coaching help.

The agent coaching system 70 includes an API server that is coupled to and provides a programmatic interface to an agent coaching application server. For example, the agent coaching application server, using the API server, receive real-time access to the communication session between the user and the agent (e.g., between devices 11, 12). The communication session can include, for example, a voice call with an agent that can be a human agent or an automated agent. The voice call can be a call via the telephone system or a call using voice over IP (VoIP). The agent coaching application server may also use the API server to receive call recordings, analytics of the call recordings, and analysis from an external system for offline processing by the agent coaching application server.

The agent coaching application server can further include speech-to-text processor that converts or transcribes an audio signal (e.g., the voice call or the call recordings) into caller utterances that include audio caller utterances and transcribed caller utterances. The agent coaching application server can also include a processor to perform natural language processing (NLP).

The agent coaching application server can include a plurality of neural networks including a variable identification neural network and a plurality of task-specific agent coaching neural networks. Each of the task-specific agent coaching neural networks is associated with a different task. In one embodiment, the variable identification neural network and the task-specific agent coaching neural networks are each bi-directional Long-Short Term Memory (LSTM) Neural Networks. The variable identification neural network and task-specific agent coaching neural networks can also be recurrent neural networks (RNN).

The agent coaching system 70 receives data (e.g., strings included in the transcribed utterances, the audio utterances or the electronic messages) and transmits data (e.g., feedback result) to, for example, the agent client device 11 and the virtual caller system 60. The agent coaching system 70 can receive and transmit data in real-time. Real-time can be during a communication session between the client devices 11, 12. In one embodiment, the agent coaching system 70 receives data (e.g., strings included in the audio utterances, the transcribed utterances or the electronic messages) from the virtual caller system 60 that is performing offline analysis of call recordings or chat transcripts between the member-related client device 12 and the agent client device 11. In this embodiment, the agent coaching system 70 can transmit data (e.g., feedback result) to the virtual caller system 60 offline. When the communication session between the agent client device 11 and the member-related client device 12 is an audio communication, the audio communication is processed in the customer service server system 2 (e.g., speech-to-text processor 18) to convert each utterance from speechto-text to generate a text string that is received by the agent coaching system 70 or to convert each utterance to an audio string that is received by agent coaching system 70.

The agent coaching application server is communicatively coupled to the database, in which is stored data processed by agent coaching application server to build and transmit the feedback result. In one embodiment, rather than including neural networks, the agent coaching application server includes a memory that stores instructions, when executed by a processor, causes processor to perform the operations of the variable identification neural network and the task-specific agent coaching neural networks.

The database of the agent action ranking system 10 can store configuration data that is used to establish settings for the agent coaching system 70. Configuration data can include minimum thresholds of agent action rankings that delineate when to provide the different feedback results to the agent's response. For example, the different feedback results can include a warning feedback icon or message (e.g., "WARNING!"), a positive feedback icon or message (e.g., "Good Job!"), or a suggestion of the ideal response to the user's last statement (e.g., "Try this: "We'll be singing your statins out today, sincerest apologies . . . ""). In this example, the minimum thresholds can include different valued thresholds for: a minimum threshold for a warning feedback (e.g., agent action ranking of 0.69), a minimum threshold for positive feedback (e.g., agent action ranking of 0.7), and a minimum threshold for response coaching, wherein a suggestion of ideal response is to be provided (e.g., agent action ranking of 0.4). Configuration data can also include ideal agent utterance threshold which is the threshold that established the minimum agent action ranking score associated with a caller utterance window to be used for training of the neural networks. The configuration data can also include a history of agent action rankings, the coaching data (e.g., the suggested ideal responses, the feedback provided), and agent survey responses.

The database of the agent action ranking system 10 can further store communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be, for example, transcribed text of full utterances provided by the user.

Virtual Caller System:

In the customer service server system 2 of FIG. 1, the virtual caller system 60 can receive configuration settings and processes the information during the communication session between the virtual caller system 20 and an agent in order to generate a virtual caller utterance. The virtual caller system 60 can also generate virtual caller utterances that include queries as well as responses. These virtual caller utterances can be used to assess the effectiveness of the agents of the customer service system.

Figure 2:
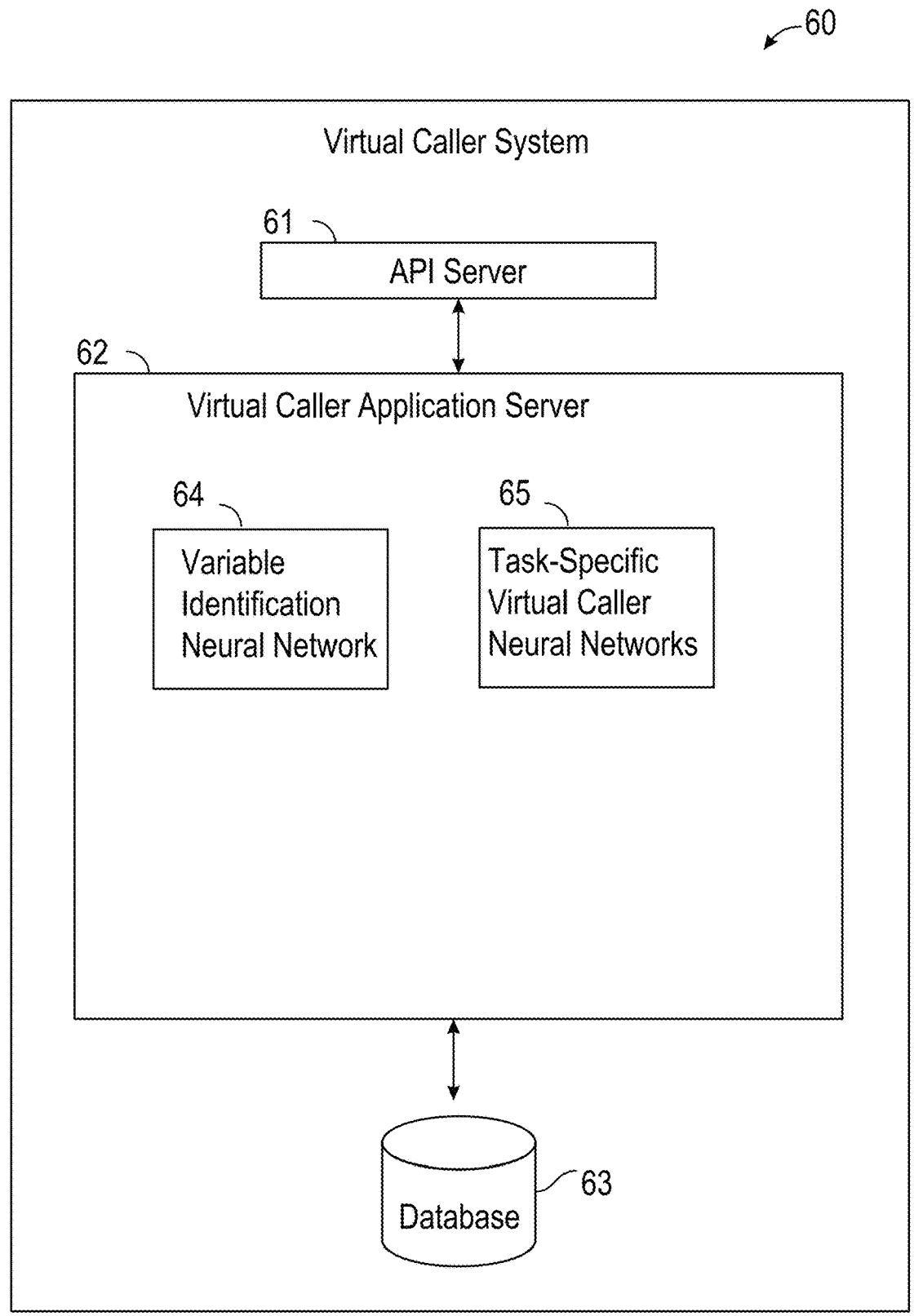
FIG. 2 is block diagram illustrating further details regarding the virtual caller system, according to exemplary embodiments.

FIG. 2 is block diagram illustrating further details regarding the virtual caller 60, according to exemplary embodiments. The virtual caller 60 includes an API server 61 that is coupled to and provides a programmatic interface to a virtual caller application server 62. For example, the virtual caller application server 62, using the API server 61, receive real-time access to the communication session between the user and the agent (e.g., between devices 11, 12). The communication session can include, for example, a voice call with an agent that can be a human agent or an automated agent. The voice call can be a call via the telephone system or a call using voice over IP (VoIP). Moreover, the virtual caller application server 62 may also use the API server to receive configuration settings from a proctor interface. The configuration settings can include, for example, the task that the virtual caller is set to complete (e.g., status query on a prescription refill), the criticality of the virtual caller's condition, the relationship between the virtual caller and the patient to which the task is pertaining, etc. The configuration settings can also include the minimum thresholds of agent action rankings that delineate when to provide the different feedback results to the agent client device. The virtual caller application server 62 may also use the API server to receive call recordings, analytics of the call recordings, and analysis from an external system for offline processing by and training of the virtual caller application server 62.

The virtual caller application server 62 can further include speech-to-text processor (not shown) that converts or transcribes an audio signal (e.g., the voice call or the call recordings) into a transcribed audio signal, identifies separate parties in the audio signal and generates start and end times for each utterance included in the audio signal. The separate parties in the audio signal include for example the caller (e.g., user or member) and the agent. The virtual caller application server 62 can identify agent utterances from the utterances included in the audio signal. When the virtual caller application server 62 receives call recordings for training, the virtual caller application server 62 can further remove agent utterances from the utterances included in the audio signal and separate the audio caller utterance from the audio signal using the start and end times for each of the utterances. The virtual caller application server 62 can then select the transcribed caller utterance from the transcribed audio signal based on the audio caller utterance. The virtual caller application server 62 can select the audio caller utterances from the audio signal. The virtual caller application server 62 can also include a processor to perform natural language processing (NLP) (not shown). The virtual caller application server 62 can further include a text-to-speech processor (not shown) that converts a text signal (e.g., the virtual caller utterance from the task-specific virtual caller neural network) to an audio signal (e.g., an audio version of the virtual caller utterance to be provided as a response to the agent in the voice call).

As shown in FIG. 2, the virtual caller application server 62 includes a plurality of neural networks including a variable identification neural network 64 and a plurality of task-specific virtual caller neural networks 65. Each of the task-specific virtual caller neural networks 65 is associated with a different task. In one embodiment, the variable identification neural network 64 and the task-specific virtual caller neural networks 65 are each bi-directional Long-Short Term Memory (LSTM) Neural Networks. The variable identification neural network 64 and task-specific virtual caller neural networks 65 can also be recurrent neural networks (RNN).

Figure 3:
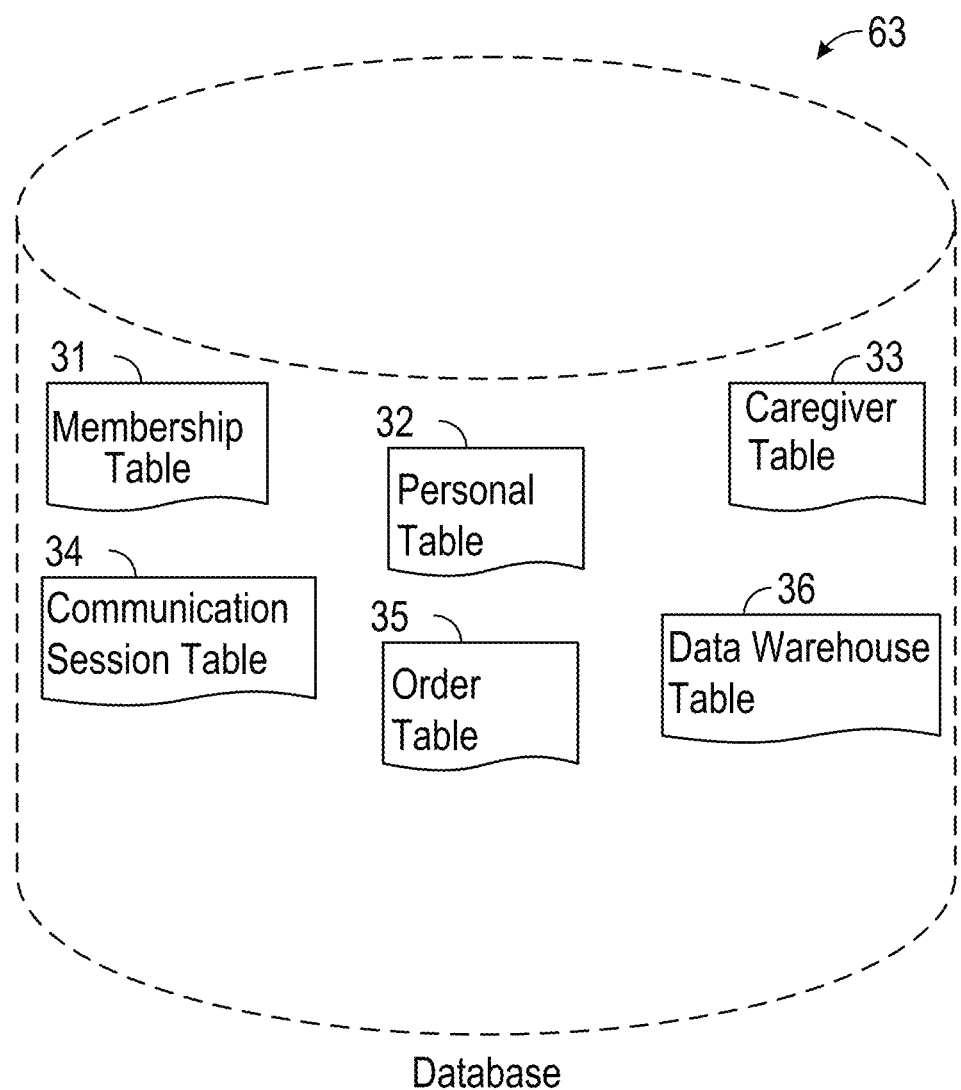
FIG. 3 is a schematic diagram illustrating data which may be stored in the database of the virtual caller system, according to various exemplary embodiments.

FIG. 3 is a schematic diagram illustrating data that is stored in the database 63 of the virtual caller system 60, according to certain exemplary embodiments. While the content of the database 63 is shown to comprise a number of tables, the data could be stored in other types of data structures (e.g., as an object-oriented database). The database 63 includes a membership table 31, a personal table 32, a caregiver table 33, communication session table 34, an order table 35, and a data warehouse table 36. In one embodiment, the membership table 31, the personal table 32, the caregiver table 33, and the order table 35 include test data such as the configuration settings or data that are received from the proctor. The test data can also include the stored results or data generated in method 400 in FIG. 4 or method 700 in FIG. 7. In one embodiment, the communication session table 34 is updated in real-time such that it comprises real-time data while the data warehouse table 36 includes historical data that is updated periodically.

The membership table 31 stores membership data that includes general membership data related to the organization, rules implemented by the organization for membership, member authentication requirements, etc. The membership data can be for example data required for authentication, specific call routing requirements, information on member benefits, information on the member's plan, etc.

The personal table 32 stores personal data related to all the members associated with the organization providing the customer service. The personal data can also be related to all other patients associated with the organization via the members. The personal table 32 can also include a personal graph that stores information regarding relationships and associations between members and other patients.

The caregiver table 33 stores caregiver data including rules applied by the organization to authenticate caregivers, identification data for each of the caregivers in the system and the patients each caregiver is associated with, etc. Caregiver data can be, for example, types of permissible data used to authenticate a person as a caregiver such as pin numbers, member numbers, etc. Caregiver data can also set the types of data to be obtained from the user to validate the caregiver relationship.

The communication session table 34 stores communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. Communication session data can also be, for example, transcribed text of full utterances provided by the user.

The order table 35 stores order information for a member (e.g., user or patient). The order information can include a listing of available orders or tasks (e.g., orders that are open or not completed for each member). Available tasks can include open refills, recent refills for order status, etc. The order information can include the date of availability of the available tasks which can be used to determine how long an available task has been open relative to the date of a communication session (e.g., a call from the member to the customer service server system 2).

The data warehouse table 36 stores historical data including all the available tasks for a membership (e.g., the member, dependents, etc.). The historical data can also include a history of existing call records, a history of completed tasks, and a historical view of the user's criticality pertaining to different situations and conditions. The historical data can include the date of availability of the available tasks which can be used to determine how long an available task has been open relative to the date of a communication session (e.g., a call from the member to the customer service server system 2). In one embodiment, the historical data also includes the length of time that an available task has been open relative to the date of a communication session. The historical data can also include messaging data pertaining to available tasks (e.g., tasks that are open or not completed for each member). The messaging data indicates when a messaging was sent or received about a given task. The messaging data can be based on dates of messages pertaining to available tasks. For example, the messaging data that is based on the dates of messages pertaining to available tasks can be used to determine the length of time between the date of a communication session (e.g., a call from the member to the customer service server system 2) and the dates of messages pertaining to available tasks. In one embodiment, the historical data also includes the length of time between the dates of messages pertaining to available tasks and the date of the communication session.

Although the following flow diagrams may describe the operations as a sequential process, many of the operations can be performed in parallel or concurrently. In addition, the order of the operations may be re-arranged. A process is terminated when its operations are completed. A process may correspond to a method, a procedure, a series of tasks, etc. The steps of methods may be performed in whole or in part, may be performed in conjunction with some or all of the steps in other methods, and may be performed by any number of different systems, such as the systems described in FIG. 1 and/or FIG. 9.

Figure 4:
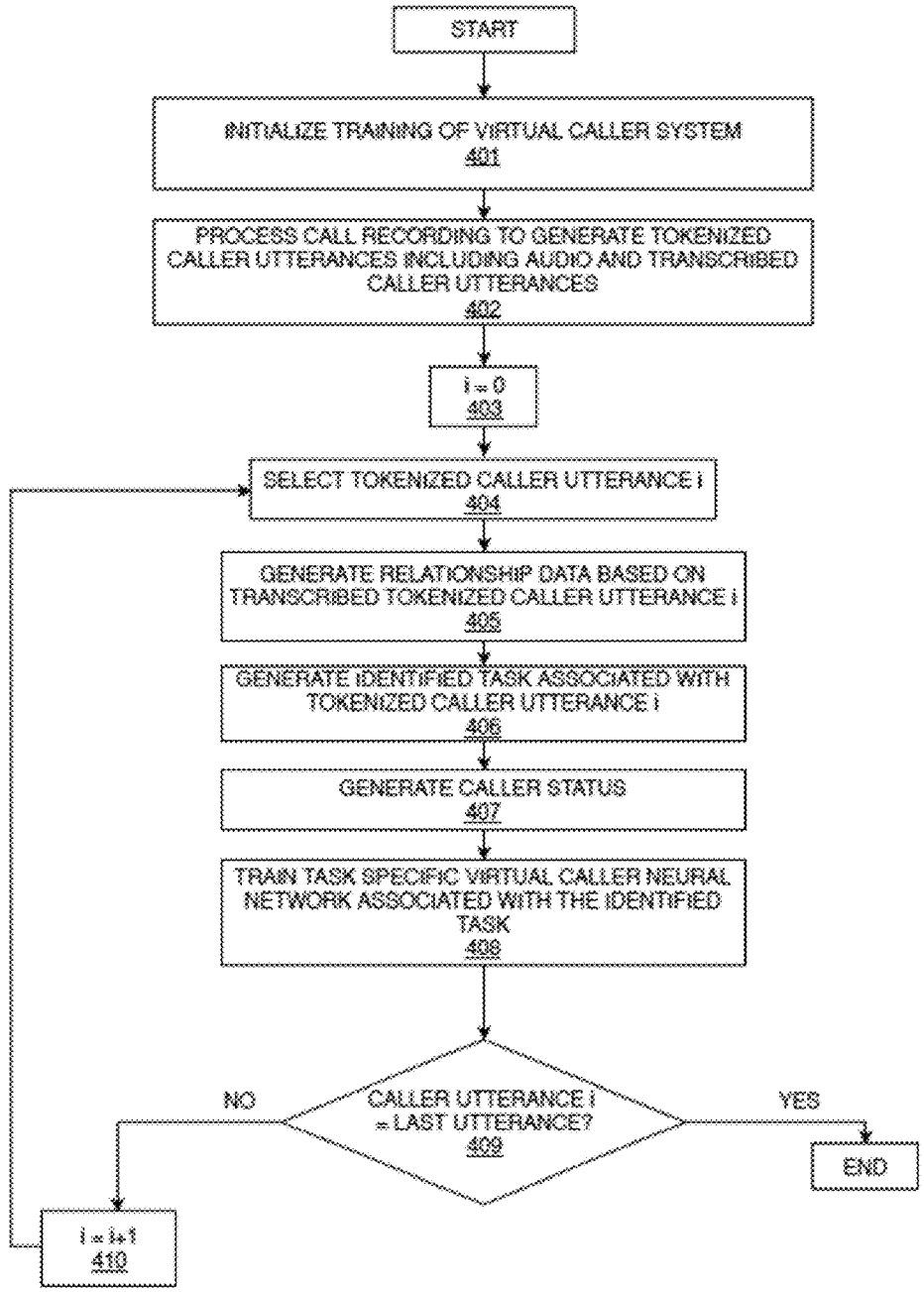
FIG. 4 is a flow diagram of an exemplary method of training the virtual caller system to generate a virtual caller utterance according to various aspects of the disclosure.

FIG. 4 is a flow diagram of an exemplary method 400 of training the virtual caller system 60 to generate a virtual caller utterance according to various aspects of the disclosure. The method 400 can be performed by the customer service server system 2 in FIG. 1. In one embodiment, a processor included in the customer service server system 2 performs the method 400 or causes the customer service server system 2 to perform the method 400.

Method 400 starts, at operation 401, the processor initializes the training of the virtual caller system 60. In some embodiments, the processor initializes the training of the virtual caller application server 62. Further details on the initialization in operation 401 is discussed with reference to FIG. 5.

At operation 402, the processor (or circuitry dedicated to performing instructed tasks) processes a call recording to generate tokenized caller utterances including audio and transcribed tokenized caller utterances. In one embodiment, the call recording is a recorded communication session between a caller (e.g., a user or a member) on a member-related client device 12 and an agent on an agent client device 11 used for system training purposes. Further details on the processing in operation 402 is discussed with reference to FIG. 6.

In order to process each of the caller utterances, at operation 403, the processor sets an index i to 0 and at operation 404, the processor selects the tokenized caller utterance i.

At operation 405, the processor generates the relationship data based on transcribed tokenized caller utterance i, which can be strings. The processor can store the relationship data in the database 53. Relationship data includes one or more potential relationships between the caller and the patient that is the subject of the transcribed caller utterance. The caller can be the member in some examples. The patient can be the member in some examples. When the caller is communicating with the agent on behalf of himself, the processor can generate the relationship data that includes "self." When the caller is communicating with the agent on behalf of another person (e.g., a patient member), the relationship data indicates the relationship between the member and the patient in order further facilitate in assisting the member. For example, the relationship types include a parent-child relationship in which the caller is the and a parent and the patient is the member's child; child-parent relationship in which the caller is a caretaker child and the patient is the member and caller's parent; spousal relationship in which the caller and the patient are spouses, either of which can be a member; and professional caregiver relationship in which the caller is a professional caregiver for the patient member. Each of the relationship types is allocated one neural network that is trained offline to assess whether a caller utterance indicates the relationship type to which it is allocated.

In some embodiments, the relationship data is generated for a plurality of transcribed tokenized caller utterances (e.g., at least a portion of the call recording). The processor can cause the relationship determination system to perform the operation 403 to generate the relationship data. For example, the relationship determination system can process the transcribed caller utterances using neural networks to generate relationship values that are associated with relationship types. Each of the neural networks used by the relationship determination system can be Long Short-Term Memory (LSTM) neural networks. In an example embodiment, the neural networks can include a Gated Recurrent Unit (GRU) neural network. The relationship determination system 10 can then generate weight values using initial context data of the member for each of the relationship types. The initial context data can include, for example, a website login information, an automatic number identifier (ANI), and telephone number. The initial context data can also include, for example, member account information such as name, address, employer, medication, insurance information, preferred pharmacy, and information on member's spouse or dependents. Using the relationship values and the weight values, the relationship determination system can generate probability values for the relationship types. The probability values for the relationship types are used to determine the potential relationships to be included in the relationship data.

At operation 406, the processor generates an identified task associated with the tokenized caller utterance i, which can be a string. In one embodiment, the processor causes the task determination system to perform the operation 406 and to generate the identified task. The task determination system can process the tokenized caller utterance i using neural networks to determine the task that the caller is requesting. The tokenized caller utterance i can be a transcribed utterance in an example embodiment. The caller utterance i can be an audio utterance or string in an example embodiment. Each of the tasks available on the customer service server system 2 can be assigned to a specific neural network. The neural networks used by the task determining system can be a Convolutional Neural Network (CNN).

At operation 407, the processor determines a caller state based on the identified task and the relationship data. The caller state can also be determined based on other data obtained from the database 63. For example, the processor can obtain historical data from, for example, the data warehouse table 36 that includes all available tasks for a given membership, the lengths of time available tasks have been available (e.g., remain open or not completed) with respect to a date of a communication session (e.g., the date of the call associated call recording), and the lengths of time dates of messages pertaining to available tasks and a date of the communication session (e.g., the date of the call associated call recording). The historical data can also include completed tasks. In another embodiment, the processor can determine the caller state based on the criticality value associated with the caller.

Using the caller state, the relationship data, the criticality value, the tokenized caller utterance and the agent utterance in response to the tokenized caller utterance, the processor trains the task-specific virtual caller neural network associated with the identified task, at operation 408.

As shown in FIG. 2, the virtual caller system 60 can also include a plurality of task-specific virtual caller neural networks 65. Each of the tasks that the virtual caller wishes to complete during a call to the customer service server system 2 is associated with a different task-specific virtual caller neural network. The task-specific virtual caller neural network to be trained at operation 408 is selected based on the identified task associated with the tokenized caller utterance. In one embodiment, the task-specific virtual caller neural network is selected based on the task specific state or data (e.g., identified task) that is obtained from the call log.

In one embodiment, the task-specific virtual caller neural networks 65 are each bi-directional Long-Short Term Memory (LSTM) Neural Networks. The task-specific virtual caller neural networks 65 can also be recurrent neural networks (RNN). The task-specific virtual caller neural networks 65 is thus trained offline to provide virtual caller utterance.

In one embodiment, the task-specific virtual caller neural networks associated with the identified task processes the transcribed agent utterance at an input layer, an embed layer, an LSTM layer, an attention layer and an output layer. The task-specific virtual caller neural network can also process a status value, a relationship data, and a criticality value in addition to the transcribed agent utterance.

In one example where the transcribed agent utterance is "I'm sorry, we don't know where the prescription is.", the status value can be set as "processing" or "backordered", the relationship data can be set to "parent/child" and the criticality value can be set to a high criticality value (e.g., 1). The input layer receives the status value, the relationship data and the criticality value as well as the transcribed agent utterance and separates the transcribed caller utterance into separate words. The status value, the relationship data and the criticality value and each word in the transcribed agent utterance is passed to the embed layer for processing. The LSTM layer further processes the values received from the embed layer and generate values that are provided to the attention layer and the output layer. The output layer is the final layer that processes and outputs a virtual caller utterance. In one embodiment, the output layer can output the separate words of the virtual caller utterance as a text (e.g., string). The virtual caller utterance includes a potential response that a caller would likely provide to the agent in response to the agent's utterance given the status value, criticality, and the relationship data (e.g., "What?!? My child needs that!").

Accordingly, at operation 408, for training purposes, the task-specific virtual caller neural network is being provided the tokenized caller utterance i which includes the caller's statement in the call recording and the agent's utterance in response. Given the same set of parameters (e.g., status value, criticality value, relationship data, identified task), the task-specific virtual caller neural network can use the tokenized caller utterance i and the agent's utterance in response as a model for the virtual caller system 60.

At operation 409, the processor determines whether the tokenized caller utterance i is the last caller tokenized utterance in the call recording. If the tokenized caller utterance i is not the last tokenized caller utterance, at operation 410, the processor increases the value of i by 1 and sets the index i to i+1 (e.g., i=i+1) and the method 400 proceeds to operation 404. If the tokenized caller utterance i is the last tokenized caller utterance, the task-specific virtual caller neural network is trained, and the processor ends the method 400. It is understood that the processor can repeat the method 400 if multiple call recordings are received.

Figure 5:
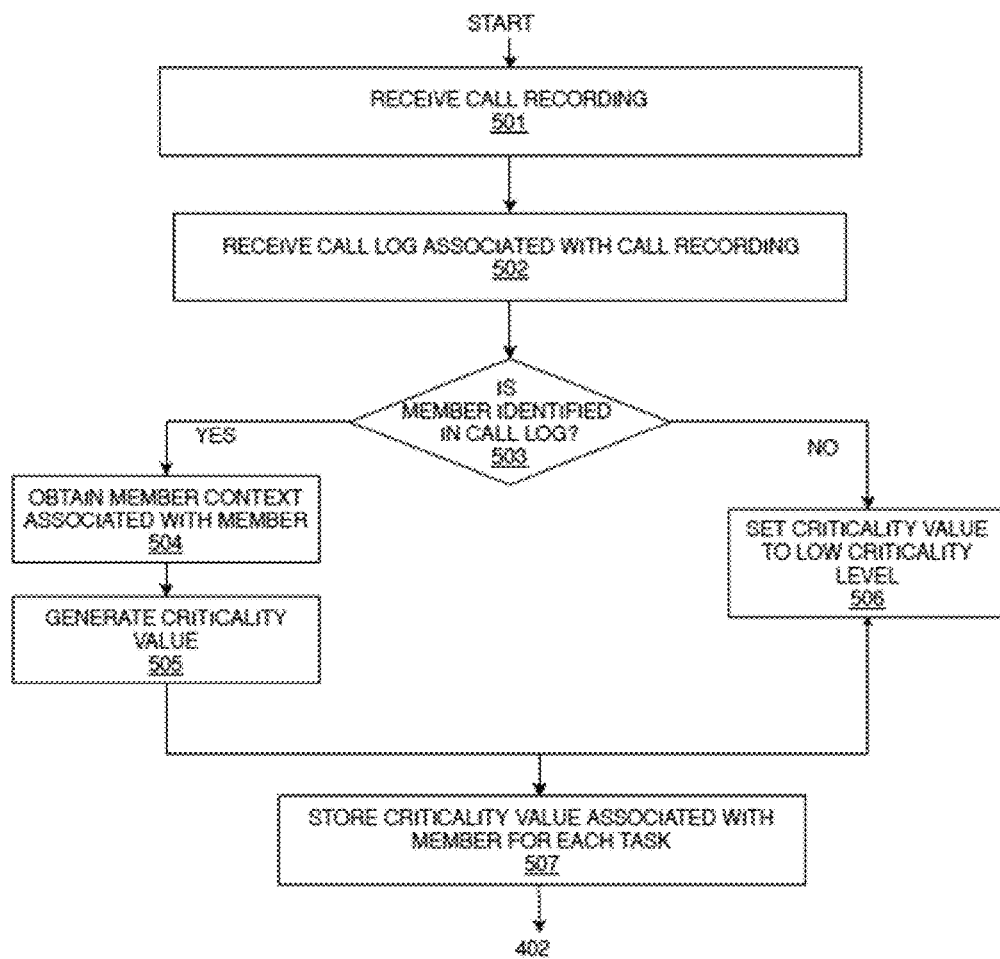
FIG. 5 is a flow diagram of an exemplary method of initiating the training (operation 401) in the method of training the virtual caller system from FIG. 4 according to various aspects of the present disclosure.

FIG. 5 is a flow diagram of an exemplary method of initiating the training (operation 401) in the method of training the virtual caller system 60 from FIG. 4 according to various aspects of the present disclosure. In one embodiment, the processor causes the virtual caller system 60 to perform the method in FIG. 5.

At operation 501, the processor receives the call recording that is a recording of the communication session between the caller and the agent (e.g., through client devices 11, 12).

At operation 502, the processor receives the call log associated with the call recording. The call log can include, for example, a listing of each task or transaction involved in the call recording, the length of time it took to process each task (e.g., handle time), identified members during the call recording, and whether the tasks were successfully completed.

At operation 503, the processor determines for each task whether a member is identified in the call log. If a member is identified, at operation 504, the processor obtains the member context associated with the member that is identified. The member context can be for example, the initial context data such as a website login information, an automatic number identifier (ANI), and telephone number and member account information such as name, address, employer, medication, insurance information, preferred pharmacy, and information on member's spouse or dependents.

At operation 505, for each task, the processor calculates the criticality value based on the member context. The criticality value indicates a level of criticality associated with the task based on the member context. For example, the criticality value can indicate the level of criticality of a condition associated with a member (e.g., user or patient). In one embodiment, the processor causes the criticality system 40 to perform the operation 505 to calculate the criticality value. The criticality value can be a value within a range (e.g., 0 to 1) from low to high criticality levels.

At operation 506, if a member is not identified at operation 503, the processor sets the criticality value to indicate a low criticality level (e.g., 0). At operation 507, the processor stores the criticality value associated with the member for each of the tasks in the call log in the database 63.

Figure 6:
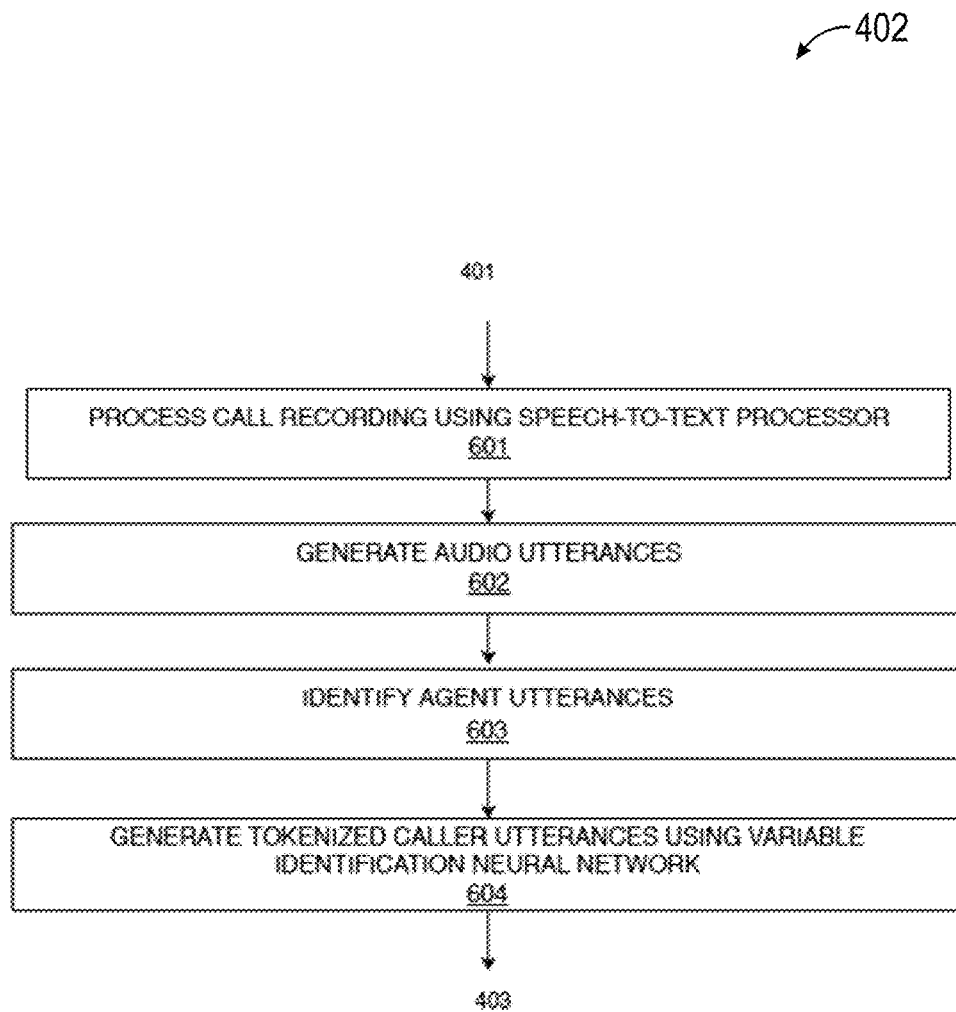
FIG. 6 is a flow diagram of an exemplary method of processing the call recording to generate tokenized caller utterances including audio and transcribed tokenized caller utterances in the method of training the virtual caller system from FIG. 4 (operation 402) according to various aspects of the present disclosure.

FIG. 6 is a flow diagram of an exemplary method of processing the call recording to generate tokenized caller utterances including audio and transcribed tokenized caller utterances (operation 402) in the method of training the virtual caller system 60 from FIG. 4, according to various aspects of the present disclosure.

At operation 601, the processor processes the call recording using the speech-to-text processor. The processing of the call recording can include transcribing the call recording into a transcribed call recording, identifying separate parties in the call recording and generating start and end times for each utterance included in the call recording. The processing of the call recording can include identifying separate parties in the call recording and generating start and end times for each utterance included in the call recording. The separate parties in the call recording include, for example, the caller and the agent.

At operation 602, using the start and end times for each utterance included in the call recording, the processor generates the audio utterances from the call recording. The processor can generate the utterances as separate audio files.

At operation 603, the processor identifies agent utterances from the audio utterances included in the call recording. In an embodiment, the processor uses a Bayesian network to deduce from the utterances in the call recording which of the parties speaking in the utterances is the agent or from the agent client device.

At operation 604, the processor generates tokenized caller utterances using a variable identification neural network 64. The variable identification neural network 64 can be a bi-directional LSTM that signals to use a specific token for variable replacement. The variable identification neural network 64 can also be recurrent neural networks (RNN). The task-specific virtual caller neural networks 65 is thus trained offline to replace the variables with tokens.

To generate the tokenized caller utterances, the processor replaces caller-specific variables in the caller utterances with tokens using the variable identification neural network 64. For example, a caller utterance that is "My prescription number is 1234" can be processed to generate a tokenized caller utterance that is "My prescription number is <prescription number>". The token <prescription number> will allow for simplified variable replacement and increases the accuracy of the training for the virtual caller system 60.

In one embodiment, the variable identification neural network 64 processes the transcribed caller utterance at an input layer, an embed layer, an LSTM layer, an attention layer and an output layer. In one example where the transcribed caller utterance is "My prescription number is 1234?". The input layer receives the transcribed caller utterance and separate the transcribed caller utterance into separate words. The status value and each word in the transcribed caller utterance is passed to the embed layer for processing. The LSTM layer further processes the values received from the embed layer and generate values that are provided to the attention layer and the output layer. The output layer is the final layer that processes and outputs a signal for each of the words in the transcribed caller utterance. The signals can include a signal to use the word or a signal to use a specific token. The output layer can output, for example, "My prescription number is <prescription number>".

In one embodiment, at operation 604, the processor generates tokenized utterances using a variable identification neural network 74 for the agent utterances and the caller utterances.

Figure 7:
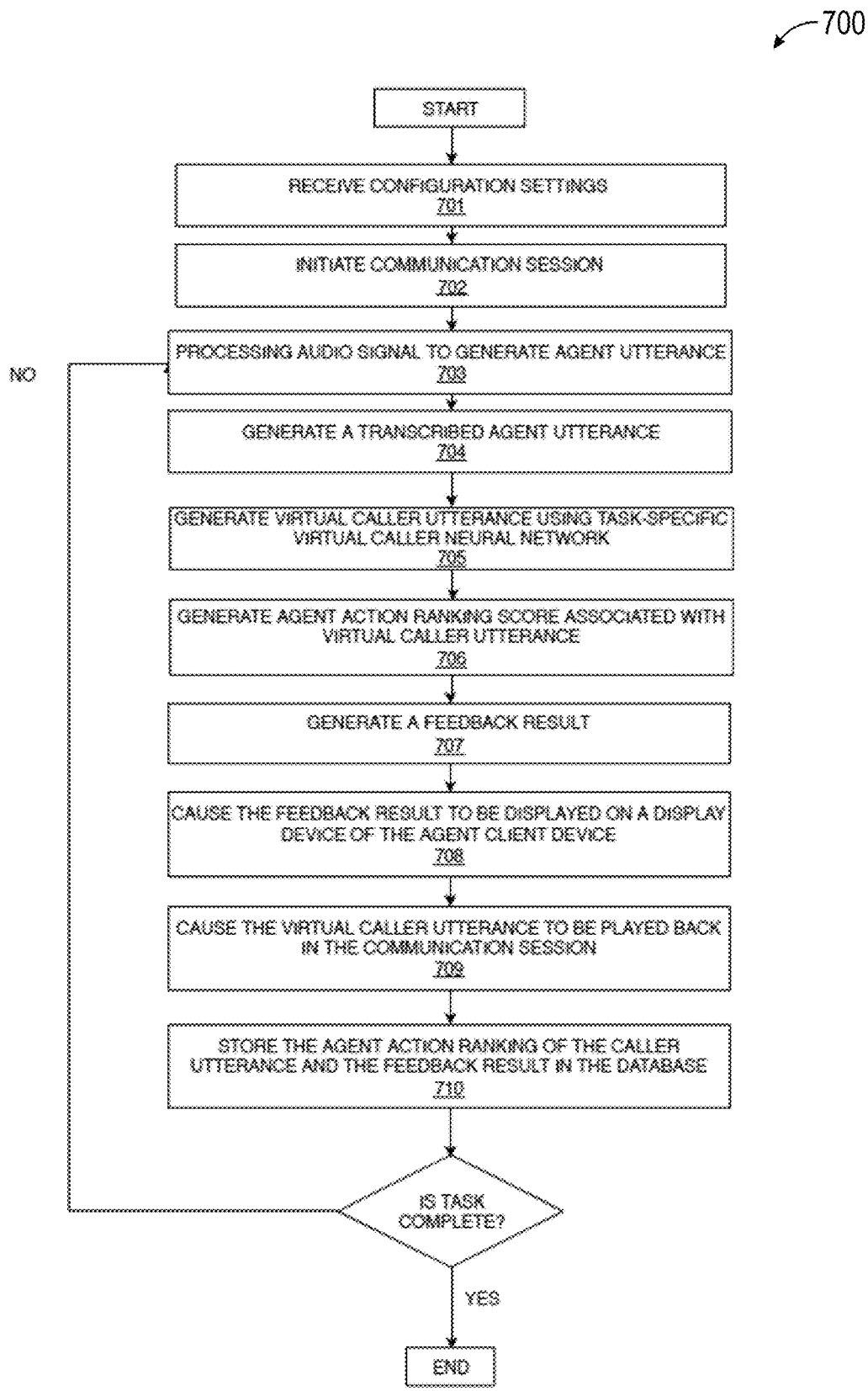
FIG. 7 is a flow diagram of an exemplary method of generating a virtual caller utterance according to various aspects of the disclosure.

Once the virtual caller system 60 is trained, the virtual caller system 60 can be used to generate the virtual caller utterance. FIG. 7 is a flow diagram of an exemplary method of generating a virtual caller utterance according to various aspects of the disclosure. In one embodiment, the processor causes the virtual caller system 60 to perform the method in FIG. 7.

The method 700 starts, at operation 701, with the processor receiving a plurality of configuration settings. The processor can receive the configuration settings from a proctor using a client device via the API server. The proctor can access the virtual caller system 60 via a proctor interface that is displayed on the proctor's client device. The configuration settings can also be stored in the database 63 such that the processor receives the configuration settings from the database 63. The configuration settings can delineate the test set of stimuli to which the virtual caller is configured. For example, the configuration settings can include the task that the virtual caller is set to complete (e.g., status query on a prescription refill), the criticality of the virtual caller's condition, the relationship between the virtual caller and the patient to which the task is pertaining, etc. The configuration settings can also include the configuration data such as the minimum thresholds of agent action rankings that delineate when to provide the different feedback results to the agent client device.

At operation 702, the processor initiates a communication session between the virtual caller system 60 and an agent client device 11. By initiating the communication session, the processor can receive an audio signal of the communication session between the virtual caller system 60 and an agent client device 11. The processor can initiate the communication session by making an outbound Session Initiation Protocol (SIP) call or establish a HyperText Transfer Protocol (HTTP) request to the agent-client device 11. The communication session between the virtual caller system 60 and the agent client device 11 can be a VoIP call or a telephony system call. The virtual caller is associated with the virtual caller system 60. A human agent or an automated agent can be associated with the agent client device 11.

At operation 703, the processor processes the audio signal of the communication session to generate an agent utterance including an audio agent utterance. In one embodiment, the audio signal is the real-time communication session between the virtual caller system 60 (e.g., the virtual caller) and an agent on an agent client device 11. Since the processor performs method 700 contemporaneously with the communication session, the processor waits for the end of an utterance in the audio signal to generate the audio agent utterance. In one embodiment, the processor can generate the audio caller utterance as a separate audio file (e.g., a wave file).

The processor, at operation 704, generates a transcribed agent utterance using a speech-to-text processor and the audio agent utterance and at operation 705, the processor generates a virtual caller utterance using one of the task-specific virtual caller neural networks 65. The task-specific virtual caller neural networks 65 can be bi-directional LSTMs or a RNNs. In one embodiment, the processor selects the task-specific virtual caller neural network that is associated with the identified task that is included in the configuration settings. The processor sets a status value based on the identified task and obtains the relationship data and the criticality value from the configuration settings. The processor then provides the task-specific virtual caller neural network that is associated with the identified task with the status value, the relationship data, and the criticality value as well as the transcribed agent utterance.

In one example where the transcribed agent utterance is "I'm sorry, we don't know where the prescription is", the status value can be set as "processing" or "backordered", the relationship data can be set to "parent/child" and the criticality value can be set to a high criticality value (e.g., 1). The output of the task-specific virtual caller neural network associated with the identified task is a virtual caller utterance. In one embodiment, the output includes the separate words of the virtual caller utterance as a text (e.g., string). The virtual caller utterance includes a potential response that a caller would likely provide to the agent in response to the agent's utterance given the status value, criticality, and the relationship data (e.g., "What?!? My child needs that!"). In one embodiment, the processor uses a text-to-speech processor to generate an audio version of the text of the virtual caller utterance.

At operation 706, the processor generates an agent action ranking score based on the virtual caller utterance. In one embodiment, the processor can signal to the agent action ranking system 10 in FIG. 1 to perform the operation 706. To generate an agent action ranking score, the processor computes and normalizes an agent action ranking score associated with the virtual caller utterance. As discussed above, the agent action ranking score is based on the difference between the task completion probability of virtual caller utterance i and the preceding caller virtual utterance i−1. Based on the difference between the task completion probability of virtual caller utterance i and the virtual caller utterance i−1, the agent action ranking score indicates a level of beneficial change or a level of negative change.

In one embodiment, to compute the agent action ranking score, the processor computes the difference (e.g., $\Delta_{slope}$) between the task completion probability of virtual caller utterance i (e.g., $P_{Current}$) and the task completion probability of preceding virtual caller utterance i−1 (e.g., $P_{Prior}$).

$$\Delta_{Slope} = P_{Current} - P_{Prior}$$

The processor can further compute the weight to attribute to the difference (e.g., $W_{Slope}$). For example, the weight of the difference (e.g., $W_{Slope}$) can be computed using the hyperbolic tangent function of the absolute value of the difference (e.g., $\Delta_{Slope}$).

$$W_{Slope} = \tan h(\text{abs}(\Delta_{Slope}))$$

The processor can compute the weight to attribute to the probability (e.g., $W_{Probability}$) by subtracting the weight of the difference (e.g., $W_{Slope}$) from 1.

$$W_{Probability} = 1 - W_{Slope}$$

Using the computed values for difference (e.g., $\Delta_{Slope}$), weight of the difference (e.g., $W_{Slope}$), and the weight of the probability (e.g., $W_{Probability}$), and the task completion probability of virtual caller utterance i (e.g., $P_{Current}$), the processor can compute the agent action ranking score i. For example, the agent action ranking score i can be computed using the following equation:

$$\text{Agent action ranking score } i = (W_{Slope} * \Delta_{Slope}) + (W_{Probability} * P_{Current})$$

In one embodiment, the processor normalizes the agent action ranking score between a low and a high value (e.g., 0 and 1). In this embodiment, large beneficial changes are associated with normalized agent action ranking scores that are near the high value (e.g., 1). It is understood that small changes as the probability nears the high value (e.g., 1) are also associated with normalized agent action ranking scores that are near the high value (e.g., 1). Similarly, large negative changes are associated with normalized agent action ranking scores that are near the low value (e.g., 0). It is understood that small changes as the probability nears the low value (e.g., 0) are also associated with normalized agent action ranking scores that are near the low value (e.g., 0).

At operation 707, the processor generates a feedback result. In one embodiment, the processor can signal to the agent coaching system 70 in FIG. 1 to perform the operation 707. The feedback result can be generated based on a minimum threshold. The minimum threshold can be included in the configuration settings and can also be stored in the database 63. In one embodiment, the minimum threshold can based on a minimum threshold for a warning feedback (e.g., agent action ranking of 0.69), a minimum threshold for positive feedback (e.g., agent action ranking of 0.7), and a minimum threshold for response coaching, wherein a suggestion of ideal response is to be provided (e.g., agent action ranking of 0.4).

In one embodiment in response to determining that the agent action ranking score is not below the predetermined minimum threshold, the feedback result includes a positive feedback icon or message (e.g., "Good Job!"). In one embodiment, in response to determining that the agent action ranking score is below the predetermined minimum threshold, the feedback result that is generated can include a warning feedback icon or message (e.g., "WARNING!"), or a suggestion of the ideal response to the user's last statement (e.g., "Try this: "We'll be singing your statins out today, sincerest apologies . . . ").

At operation 708, the processor causes the feedback result to be displayed on a display device of the agent client device 11. The processor can also cause a survey related to the feedback result to be displayed on the display device of the agent client device. The survey can include a query such as "Was this helpful?" that is displayed in conjunction with the feedback result. In one embodiment, the survey can include icons, radio buttons, or text input boxes to receive the response from the agent client device 11. The processor can receive a survey response from the agent client device 11. In one example, the survey response is a yes or no answer that is provided via icons, radio buttons, or text input boxes displayed on display device of the agent client device 11

At operation 709, the processor causes the virtual caller utterance that is generated by the task-specific virtual caller neural network associated with the identified task (e.g., "What?!? My child needs that!") to be played back in the communication session to the agent client device 11. In one embodiment, the processor uses a text-to-speech processor to generate an audio version of the text of the virtual caller utterance.

At operation 710, the processor stores the agent action ranking of the virtual caller utterance and the feedback result in the database 63. The processor can store the agent action ranking score or the normalized agent action ranking score in the database 63. The agent action ranking score or the normalized agent action ranking score can be stored in association with the virtual caller utterance. In one embodiment, the processor also stores the survey response in the database 63.

The processor then determines, at operation 711, if the identified task from the configuration settings is complete. For example, if the virtual caller is calling about a prescription refill, the identified task is complete when the status of the prescription refill is adequately provided to the virtual caller. In response to determining that the identified task is not complete (e.g., agent is unsure where the prescription is), the processor proceeds to operation 703, to process the audio signal and generate another agent utterance. In response to determining that the identified task is complete (e.g., agent provides status of the prescription), the processor ends the process 700.

In one embodiment, the operations 706, 707, 708, and 710 can be optionally performed by the processor. In this embodiment, the processor does not generate the agent action ranking score (operation 706), generate the feedback result (operation 707), cause the feedback result to be displayed (operation 708), and store the agent action ranking and the feedback result (operation 710).

Figure 8:
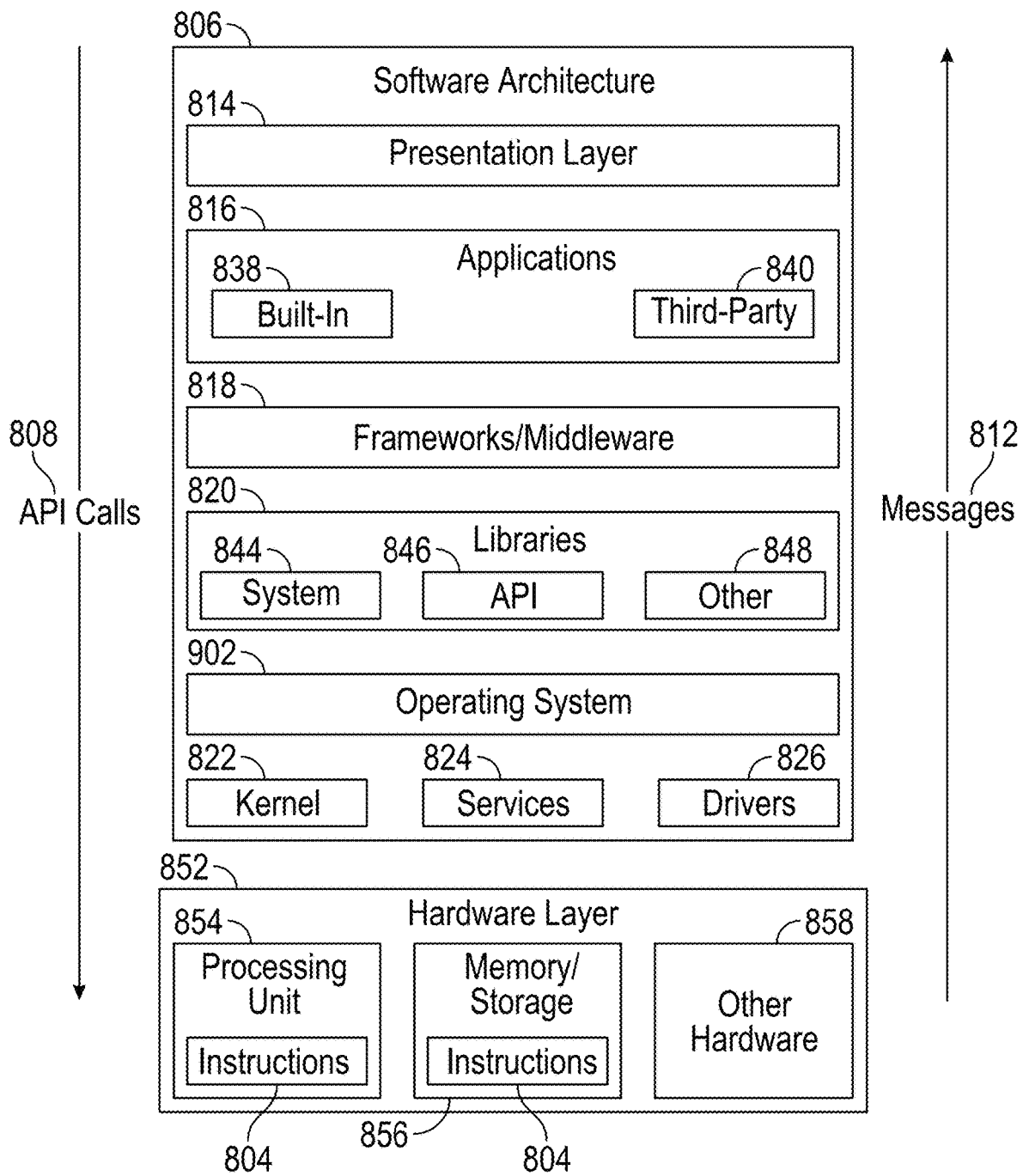
FIG. 8 is a block diagram illustrating a representative software architecture, which may be used in conjunction with various hardware architectures herein described.

FIG. 8 is a block diagram illustrating an exemplary software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory or storage modules memory/storage 856, which also have executable instructions 804. The hardware layer 852 may also comprise other hardware 858.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a processor or other programmable processor. Once configured by such software, hardware components become specific machines (or specific components of a machine) uniquely tailored to perform the configured functions and are no longer processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit, circuitry, or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously. The processor as used herein may be a hardware component, which is in at least one of the devices, systems, servers and the like. The processor may include multiple cores and may be spread across multiple devices. The processor includes circuitry to execute instructions relating to the methods and structures described herein for determining relationships and outputting relationship data that is used by various device and their users.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a processor configured by software to become a special-purpose processor, the processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 or other components within the layers may invoke application programming interface (API) API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 or other components or layers. The libraries 820 provide functionality that allows other software components to perform tasks in an easier fashion than to interface directly with the underlying operating system 802 functionality (e.g., kernel 822, services 824 or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 or other software components/modules, some of which may be specific to a particular operating system 802 or platform.

The applications 816 include built-in applications 838 or third-party applications 840. The third-party applications 840 may invoke the API calls 808 provided by the operating system 802 to facilitate functionality described herein.

The applications 816 may use built in operating system functions (e.g., kernel 822, services 824 or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
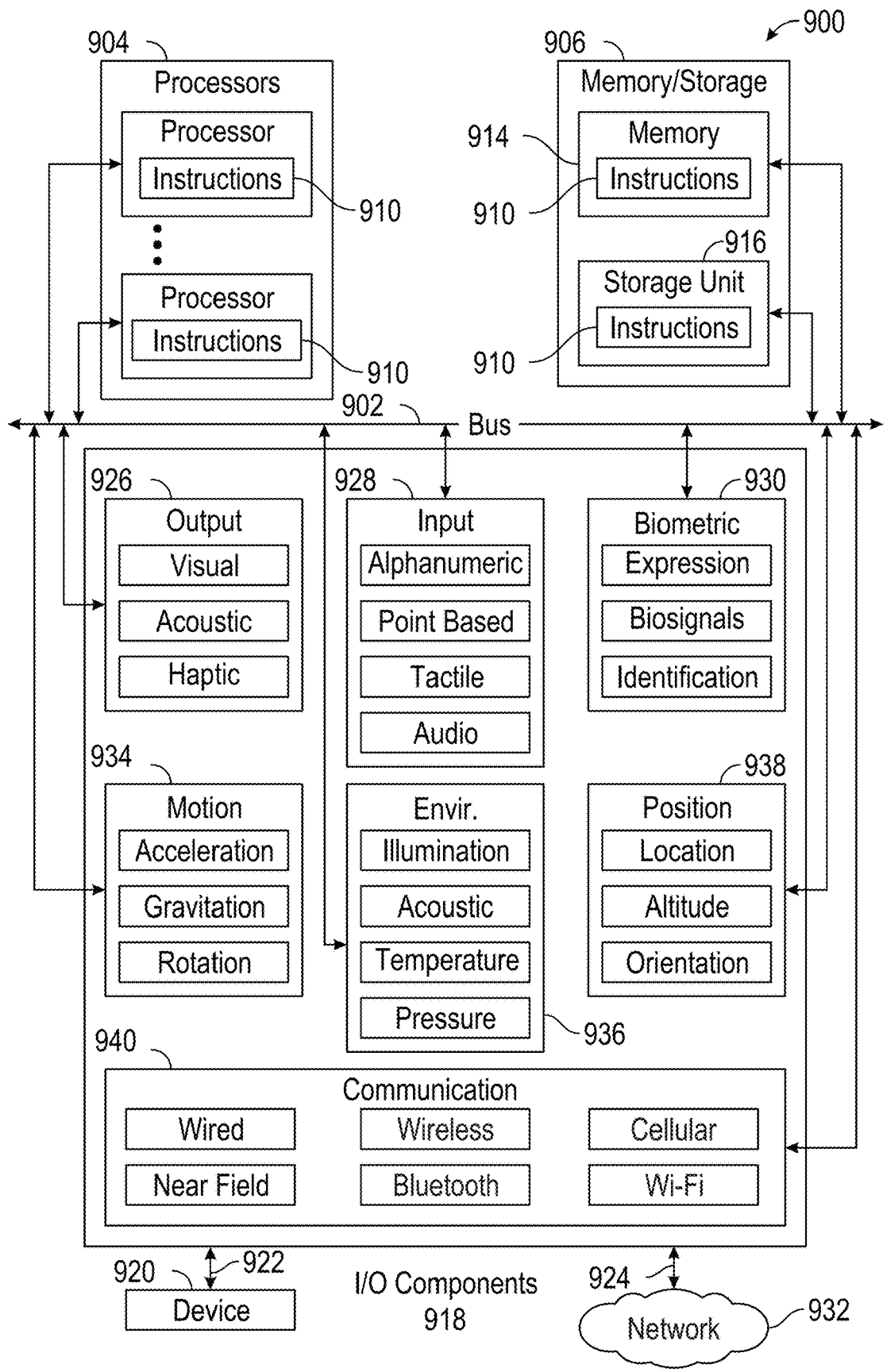
FIG. 9 is a block diagram illustrating components of a machine, according to some exemplary embodiments, able to read instructions from a machine-readable medium (e.g., a machine-readable storage medium) and perform any one or more of the methodologies discussed herein.

FIG. 9 is a block diagram illustrating components (also referred to herein as "modules") of a machine 900, according to some exemplary embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a laptop computer, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 1002. The memory/storage 906 may include a memory 914, such as a main memory, or other memory storage, and a storage unit 916, both accessible to the processors 904 such as via the bus 1002. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 918 may include a wide variety of components to provide a user interface for receiving input, providing output, producing output, transmitting information, exchanging information, capturing measurements, and so on. The specific I/O components 918 that are included in the user interface of a particular machine 900 will depend on the type of machine. It will be appreciated that the I/O components 918 may include many other components that are not shown in FIG. 9. The I/O components 918 are grouped according to functionality merely for simplifying the following discussion and the grouping is in no way limiting. In various exemplary embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 928 may also include one or more image-capturing devices, such as a digital camera for generating digital images or video.

In further exemplary embodiments, the I/O components 918 may include biometric components 930, motion components 934, environmental environment components 936, or position components 938, as well as a wide array of other components. One or more of such components (or portions thereof) may collectively be referred to herein as a "sensor component" or "sensor" for collecting various data related to the machine 900, the environment of the machine 900, a user of the machine 900, or a combination thereof.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)). Moreover, the communication components 940 may detect identifiers or include components operable to detect identifiers.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor; and
a memory component having instructions stored thereon, when executed by the processor, causes the processor to perform operations comprising:
receiving a plurality of configuration settings, wherein the configuration settings include an identified task and relationship data;
initializing a communication session with an agent client device, wherein the communication session is between a virtual caller associated with the system and the agent client device, wherein the identified task includes a task to be completed by the virtual caller during the communication session, wherein the relationship data includes at least one potential relationship between the virtual caller and a patient that is a subject of the identified task;
processing an audio signal of the communication session to generate an agent utterance;
generating a transcribed agent utterance based on the agent utterance using a speech-to-text processor;
selecting, from a plurality of virtual caller operations, a task-specific virtual caller operation that is associated with the identified task;
generating a virtual caller utterance using the task-specific virtual caller operation associated with the identified task, wherein generating the virtual caller utterance is based on the transcribed agent utterance, wherein generating the virtual caller utterance using the task-specific virtual caller operation further comprises:
generating the virtual caller utterance using a task-specific virtual caller neural network that is associated with the identified task; and
causing the virtual caller utterance to be played back in the communication session to the agent client device.

2. The system of claim 1, wherein generating the virtual caller utterance is further based on a criticality value.

3. The system of claim 2, wherein the criticality value that indicates a level of criticality associated with the identified task.

4. The system of claim 3 wherein the level of criticality is dependent on a medical history of the patient.

5. The system of claim 4, wherein generating the virtual caller utterance is further based on the relationship data.

6. A system comprising:
a processor; and
a memory component having instructions stored thereon, when executed by the processor, causes the processor to perform operations comprising:
receiving a plurality of configuration settings, wherein the configuration settings include an identified task and relationship data;
initializing a communication session with an agent client device, wherein the communication session is between a virtual caller associated with the system and the agent client device, wherein the identified task includes a task to be completed by the virtual caller during the communication session, wherein the relationship data includes at least one potential relationship between the virtual caller and a patient that is a subject of the identified task;
processing an audio signal of the communication session to generate an agent utterance;
generating a transcribed agent utterance based on the agent utterance using a speech-to-text processor;
selecting, from a plurality of virtual caller operations, a task-specific virtual caller operation that is associated with the identified task;

generating a virtual caller utterance using the task-specific virtual caller operation associated with the identified task, wherein generating the virtual caller utterance is based on the transcribed agent utterance, and
causing the virtual caller utterance to be played back in the communication session to the agent client device, wherein generating the virtual caller utterance using the task-specific virtual caller operation associated with the identified task further comprises:
generating the virtual caller utterance using a task-specific virtual caller neural network that is associated with the identified task.

7. The system of claim 6, wherein the task-specific virtual caller neural network includes a bi-directional long short-term memory (LSTM) that receives the transcribed agent utterance as an input.

8. The system of claim 1, wherein the processor to perform operations further comprising:
generating a status value based on the identified task, wherein generating the virtual caller utterance is further based on the status value.

9. The system of claim 1, wherein the processor to perform operations further comprising:
generating an agent action ranking score associated with the virtual caller utterance;
generating a feedback result based on the agent action ranking score; and
causing the feedback result to be displayed on a display device of the agent client device.

10. A method comprising:
receiving a plurality of configuration settings, wherein the configuration settings include an identified task, a relationship data, and a criticality value;
initializing a communication session with an agent client device, wherein the communication session is between a virtual caller associated with a virtual caller system and the agent client device, wherein the identified task includes a task to be completed by the virtual caller during the communication session, wherein the relationship data includes at least one potential relationship between the virtual caller and a patient that is a subject of the identified task;
processing an audio signal of the communication session to generate an agent utterance;
generating a transcribed agent utterance based on the agent utterance using a speech-to-text processor;
selecting, from a plurality of virtual caller operations, a task-specific virtual caller operation that is associated with the identified task;
generating a virtual caller utterance using the task-specific virtual caller operation associated with the identified task, wherein generating the virtual caller utterance is based on the transcribed agent utterance, wherein generating the virtual caller utterance using the task-specific virtual caller operation further comprises:
generating the virtual caller utterance using a task-specific virtual caller neural network that is associated with the identified task; and
causing the virtual caller utterance to be played back in the communication session to the agent client device.

11. The method of claim 10, wherein generating the virtual caller utterance is based on a criticality value.

12. The method of claim 11, wherein the criticality value is selected to indicate a level of criticality associated with the identified task.

13. The method of claim 12, wherein the level of criticality is dependent on a medical history of the patient.

14. The method of claim 13, wherein generating the virtual caller utterance is further based on the relationship data.

15. The method of claim 14, wherein the communication session includes a voice call using a telephone system or voice over IP (VoIP).

16. The method of claim 14, further comprising:
generating an agent action ranking score associated with the virtual caller utterance;
generating a feedback result based on the agent action ranking score; and
causing the feedback result to be displayed on a display device of the agent client device.

17. The method of claim 10, wherein generating the virtual caller utterance using the task-specific virtual caller operation includes generating the virtual caller utterance using a bi-directional long short-term memory (LSTM) that receives the transcribed agent utterance as an input.

18. The method of claim 10, further comprising:
generating a status value based on the identified task, wherein generating the virtual caller utterance is further based on the status value.

19. The method of claim 10, further comprising:
generating an agent action ranking score associated with the virtual caller utterance;
generating a feedback result based on the agent action ranking score; and
causing the feedback result to be displayed on a display device of the agent client device.

* * * * *